Jan. 27, 1953   H. S. PIKE   2,626,523
SPRING CONTACT TESTING APPARATUS
Filed Dec. 24, 1946
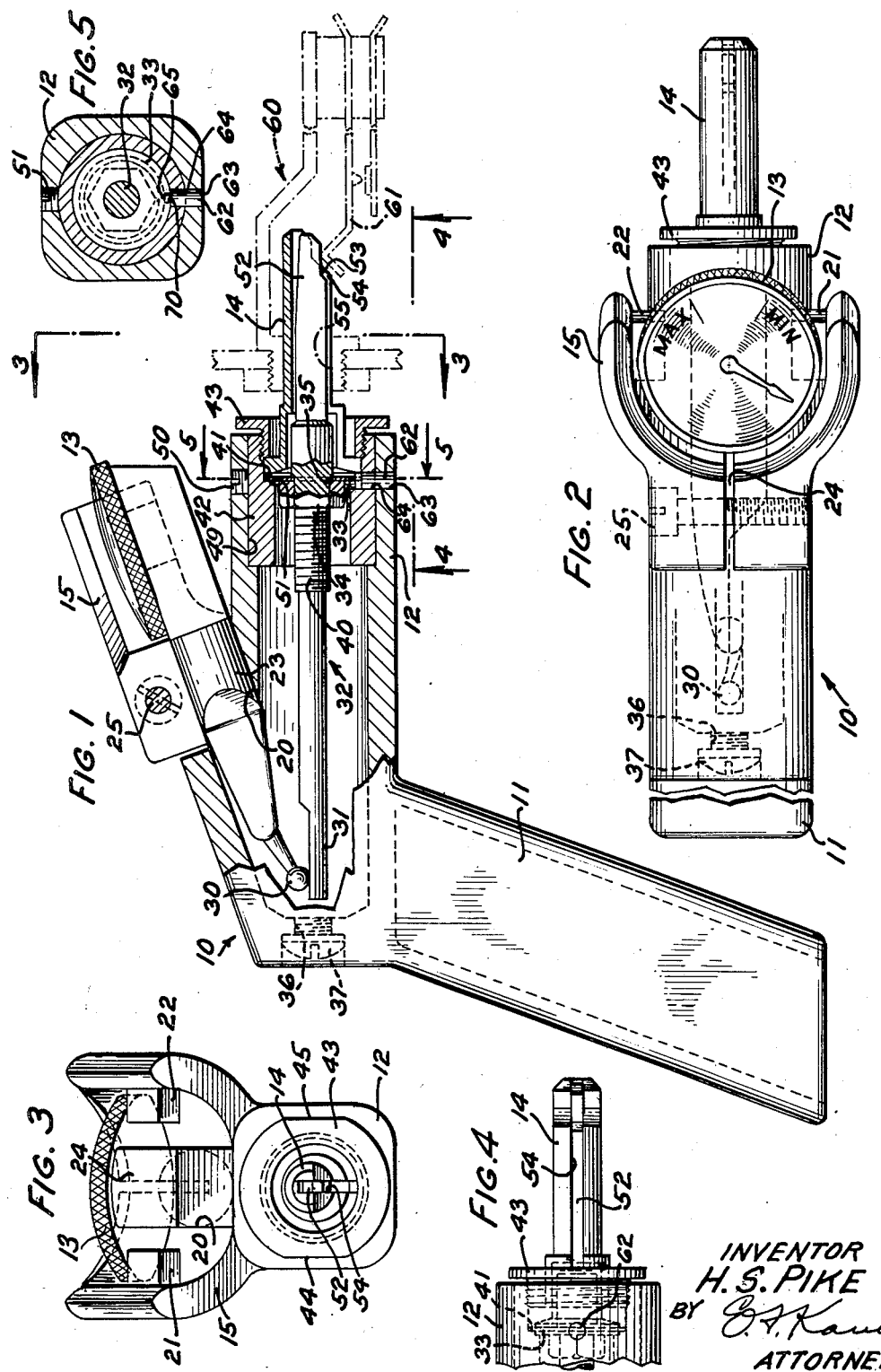
INVENTOR
H. S. PIKE
BY
ATTORNEY

Patented Jan. 27, 1953　　　　　　　　　　　　　　　　　　　　　　　　　　　2,626,523

UNITED STATES PATENT OFFICE 2,626,523

SPRING CONTACT TESTING APPARATUS

Harold S. Pike, Fanwood, N. J., assignor to Western Electric Company, Incorporated, New York, N. Y., a corporation of New York Application December 24, 1946, Serial No. 718,217

6 Claims. (Cl. 73—161)

1

This invention relates to spring contact testing apparatus and more particularly to an apparatus for determining the tension of leaf-type jack springs.

An object of this invention is to provide a new and efficient gage for testing the tension of springs.

In accordance with one embodiment of this invention a pistol-shaped housing carries a dial gage which indicates the tension of a jack spring when the end of a pistol "barrel" is inserted into the jack. The jack spring is engaged by a trigger projecting from the barrel and extending through and fixed to a resilient diaphragm within the pistol housing. The other end of the trigger is a flat blade which engages the contact member of the dial gage adjacent the end of the blade to actuate the gage.

A complete understanding of the invention will be had by reference to the following detailed description taken in conjunction with the accompanying drawings, in which:

Fig. 1 is a side elevation partly in cross section of a preferred embodiment of the invention;

Fig. 2 is a plan view of the apparatus shown in Fig. 1, part being broken away to conserve space;

Fig. 3 is a front elevation partly in cross section of the apparatus shown in Fig. 1 with part of the pistol grip omitted and the cross section being taken substantially along the line 3—3 of Fig. 1;

Fig. 4 is a bottom view of the barrel of the apparatus shown in Fig. 1, the view being taken along the line 4—4 of Fig. 1; and Fig. 5 is a cross-sectional view taken on the line 5—5 of Fig. 1.

As shown in the drawings, a pistol-shaped housing 10 having a hand grip 11 and a barrel 12 is provided with a dial gage 13 of any suitable type and a barrel extension or what may be better described as a trigger housing 14. A bifurcated member 15 integral with the housing 10 and extending at an angle therefrom is provided with an aperture 20 and a pair of lugs 21 and 22 which together support the dial gage 13. A suitable gage 13 is one which has a contact member 30 extending through a shank 23 which may be inserted in the aperture 20 and clamped by forcing together a split section 24 of the member 15 by means of a screw 25 threaded into this section.

The contact member 30 of the gage 13 is engaged by the flat end 31 of a lever 32 which extends through and is rigidly fixed to a resilient diaphragm 33 by clamping the diaphragm between a nut 34 and a shoulder 35 formed on an enlarged and threaded portion 40 of the lever 32. A threaded peephole 36 normally closed by a screw 37 is provided at the back end of the

2 housing 10 so that the contact between the lever end 31 and the contact member 30 may be visually checked. The periphery of the diaphragm 33 is clamped between an internal annular shoulder 41 in a bushing 42 and the base of the trigger housing 14 which is forced against the diaphragm by a threaded collet 43. Flats 44 and 45 may be formed on the collet 43 to permit the use of straight jawed wrenches when tightening the collet. A counterbore 49 in the end of the barrel 12 accommodates the bushing 42 which is held in position by a set screw 50 threaded into the barrel 12. An annular shoulder 51 is formed on the inside of the bushing 42 to provide sufficient space adjacent the diaphragm to allow the fullest freedom for the diaphragm.

The other end of the lever 32 is formed into a flat trigger 52 with a slight off-set 53 at its end that extends through a slot 54 in the trigger housing 14 which is cut away at the end to expose the end of the trigger. The trigger housing is shaped to conform to the opening 55 of a jack 60 in which the spring 61 is to be tested. Relative alignment is maintained and radial displacement is prevented by a pin 62 force-fitted into coaxial apertures 63 and 64 in the barrel 12 and the bushing 42, respectively. A nib 65 on the end of the pin engages the slot 54 in the trigger housing 14 and a slot 70 formed in the edge of the diaphragm 33. This prevents radial displacement of the diaphragm, the lever and the trigger housing. The lever 32 is normally biased to proper position by the elastic action of the diaphragm 33, and it is to be understood that this action may be supplemented by springs acting on the lever 32 if it is so desired.

In the operation of the apparatus, the trigger housing 14 is inserted into the jack opening 55 until the apex of the V at the end of the spring 61 engages the end of the trigger 52. The trigger is displaced according to the tension in the jack spring, and this displacement causes a proportional displacement at the other end 31 of the lever 32 through the flexage of the diaphragm 33. This actuates the contact member 30 of the dial gage 13 which will indicate the tension of the spring in whatever arbitrary units that the dial gage may be calibrated. For testing within predetermined limits the dial may be calibrated in terms of maximum and minimum with the aid of standard tension springs.

What is claimed is:

1. An apparatus for testing spring characteristics comprising a hollow generally tubular housing, a displacement responsive indicating device mounted on said housing and having a contact member, said contact member being displaceable to actuate the indicating device, a diaphragm clamped at its periphery in said housing, a lever extending through and secured to said diaphragm normal to the plane of said diaphragm, one end of said lever extending into said housing and engaging said contact member and the other end extending out of said housing and adapted to engage an element to be tested, and a guide tube around the last said end of said lever, said guide tube being fastened to the housing and fittable into a socket positioned in front of the contact member, said tube having a cut-away portion to expose a portion of the last said end of said lever.

2. An apparatus for determining spring tension, which comprises a barrel having an extension designed to be fitted into a socket positioned in front of a spring contact said extension having a slot extending from the free end thereof, a feeler mounted pivotally in the barrel and the extension and projecting beyond a portion of the end of the extension for engaging the spring contact when the extension is fitted into the socket, resilient means urging the feeler against the spring contact and resisting pivotal movement of the feeler by the spring contact, and means carried by the barrel for measuring pivotal movement by the spring contact of the feeler against the action of the resilient means.

3. An apparatus for determining spring tension, which comprises a pistol-shaped housing having a reduced extension designed to be fitted snugly into a socket positioned in front of a spring contact extending therealong, a diaphragm, means fastening the periphery of the diaphragm to the housing in alignment with the extension, a rigid feeler secured rigidly to the central portion of the diaphragm and extending beyond the free end of the extension when the extension is inserted into the socket for engaging the spring contact, and means carried by the housing responsive to movement of the feeler by the spring contact for measuring the movement thereof.

4. An apparatus for determining spring tension of a spring contact positioned beyond a socket, which comprises a barrel-like housing having a reduced tubular extension designed to be inserted into such a socket in close-fitting engagement therewith, said extension having a relieved end portion to provide clearance for the contact when the extension is fitted into the socket, a feeler, means mounting the feeler pivotally in said barrel-like housing in a position in which one end of the feeler projects beyond the relieved end portion of the extension and engages the spring contact when the extension is inserted into the socket, resilient means normally holding the feeler in such a position that the feeler is displaced by engagement with the spring contact, and a dial indicator fastened to the housing for measuring displacement of the feeler by the spring contact.

5. An apparatus for determining spring tension, which comprises a barrel provided with an extension having a slot extending longitudinally along the free end portion thereof designed to be inserted into a socket positioned in front of a spring contact, a blade, a diaphragm, means rigidly securing the blade to the central portion of the diaphragm, means securing the periphery of the diaphragm rigidly to said barrel to mount the blade pivotally in the extension and in a position extending through the slot and in engagement with the spring contact, and means fastened to the barrel for measuring pivotal movement of the feeler by the spring contact.

6. A device for determining spring characteristics comprising a pistol-shaped hollow housing having a barrel portion provided with a tubular extension relieved at its free end designed to fit closely into a socket, a diaphragm secured at its periphery in said barrel, a trigger secured to the diaphragm and extending out of the relieved portion of the extension for engaging an element positioned behind the socket, and means mounted on the barrel measuring displacement of the trigger against the action of the diaphragm by a contacted element.

HAROLD S. PIKE.

REFERENCES CITED

The following references are of record in the file of this patent:

UNITED STATES PATENTS

| Number | Name | Date |
|---|---|---|
| 306,062 | Creelman | Oct. 7, 1884 |
| 1,543,560 | Eberhardt | June 23, 1925 |
| 1,565,577 | McDonough | Dec. 15, 1925 |
| 2,024,571 | Gent | Dec. 17, 1935 |
| 2,077,510 | Boehler | Apr. 20, 1937 |
| 2,159,969 | Furst | May 30, 1939 |
| 2,258,424 | Smith | Oct. 7, 1941 |

FOREIGN PATENTS

| Number | Country | Date |
|---|---|---|
| 369,588 | Germany | Mar. 21, 1932 |